United States Patent [19]
Koizumi et al.

[11] Patent Number: 4,765,739
[45] Date of Patent: Aug. 23, 1988

[54] FIBER OPTICAL ROTATION SENSOR UTILIZING THE SAGNAC PHASE DIFFERENCE

[75] Inventors: Tadashi Koizumi, Yokohama; Toshiya Kinoshita, Kawasaki, both of Japan

[73] Assignee: Kabushiki Kaisha Toshiba, Kawasaki, Japan

[21] Appl. No.: 924,741

[22] Filed: Oct. 30, 1986

[30] Foreign Application Priority Data

Nov. 6, 1985 [JP] Japan .................................. 60-248317

[51] Int. Cl.$^4$ .......................... G01C 19/64; G01B 9/02
[52] U.S. Cl. .................................................... 356/350
[58] Field of Search ......................................... 356/350

[56] References Cited

PUBLICATIONS

Direct Rotation-Rate Detection with a Fibre-Optic Gyro by Using Digital Data Processing, K. Bohm et al., Electronics Letters 10th Nov. 1983, vol. 19, No. 23, p. 997.

Primary Examiner—Vincent P. McGraw
Assistant Examiner—S. A. Turner
Attorney, Agent, or Firm—Oblon, Fisher, Spivak, McClelland & Maier

[57] ABSTRACT

In a fiber optical rotation sensor, a laser wave omitted from a laser diode is guided into a one directional optical coupler and is splitted into two laser waves by the coupler. The two laser waves are propagated in an optical fiber loop in an opposite directions and the phases of the laser waves are modulated in the fiber loop by a phase modulation signal having a frequency $f_0$. The phase-modulated light waves are combined and converted into an interference laser wave and the interference laser wave is splitted in the coupler. One of the splitted interference laser waves is guided to a photodetector and is converted into an electric signal by the photodetector. A synchronous detector detects the electric signal with a frequency of an integral multiple of the frequency $f_0$ to extract the corresponding integral multiple signal components $Sn-1$, $Sn$, $Sn+1$. The signal components $Sn-1$, $Sn$, $Sn+1$ ($n \geq 1$) are supplied to operation circuit. In the operation circuit, the signal components $Sn-1$, $Sn$, $Sn+1$ are processed to obtain Sagnac phase difference $\Delta\phi$ from the following equation.

$$\Delta\phi = \tan^{-1}\left(\frac{Jn-1+Jn+1}{Jn} \cdot \frac{Sn}{Sn-1+Sn+1}\right)$$

5 Claims, 4 Drawing Sheets

F I G. 1
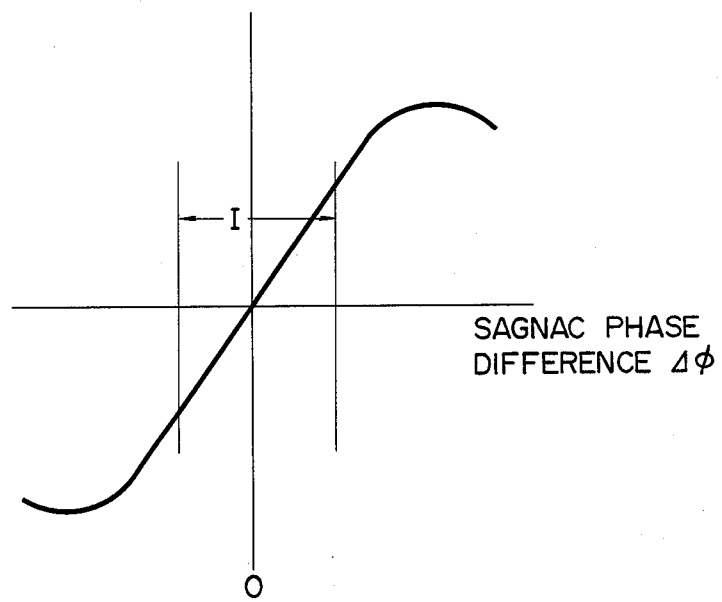

FIBER OPTICAL ROTATION SENSOR UTILIZING THE SAGNAC PHASE DIFFERENCE

BACKGROUND OF THE INVENTION

This invention relates to a fiber optical rotation sensor, such as a fiber optical gyroscope, which measures a phase difference of light waves propagating in opposite directions within an optical fiber and senses a speed corresponding to an angle of rotation of a rotating body.

A fiber optical gyroscope, for example, as a sensor for sensing a speed corresponding to an angle of rotation is disclosed, for example, in (1) International Publication No. WO 82/03456 entitled "Fiber Optical Rotation Sensor", published on Oct. 14, 1982;

(2) International Publication No. WO 83/01683 entitled "Multimode Fiber Optical Rotation Sensor", published on May 11, 1983; and (3) International Publication No. WO 83/00552 entitled "Fiber Optical Rotation Sensor Utilizing Unpolarized Light" published on Feb. 17, 1983.

The fiber optical gyroscope senses an amount of a phase difference, i.e., a Sagnac phase difference, between light waves mutually counter-propagating in an optical fiber loop on a rotating body as produced due to the rotation of the rotating body. In the fiber optical gyroscope, a whole light wave propagating path located between an optical source and a sensing section for sensing interference light waves occurring due to an interference between mutually counter-propagating waves can accurately be made up of an optical fiber and thus has a longer service file.

The fiber optical gyroscope of the aforementioned International Publications uses a phase modulation system in which light waves launched into an optical fiber loop are phase-modulated for interference. In the fiber optical gyroscope the interference light wave is sensed at a photodetector and a sensed signal is supplied to a lock-in amplifier comprised of a synchronous detector and low pass filter. In the lock-in amplifier, the output signal of the photodetector is detected with a phase modulation frequency $f_0$, only a frequency ($f_0$) component is detected from the sensed signal by the synchronous detector and only a DC component of the detected component is delivered from the low pass filter.

The output signal of the DC component is proportional to $$J_1(\phi m) \times \sin\Delta\phi$$

a product of Bassel function $J_1(\phi m)$ and $\sin\Delta\phi$, where $\Delta\phi$: a Sagnac phase difference $\phi m$: the phase modulation amplitude $J_1(\phi m)$: the Bessel function If the amount of phase modulation is set at a stable point at which the value of a first-order Bessel function does not vary greatly, then a filter output of $J_1 \cdot \sin\Delta\phi$ becomes a sinusoidal function of the Sagnac phase difference $\Delta\phi$ and, as shown in FIG. 1, the Sagnac phase difference $\Delta\phi$ can uniquely be determined from the output level through the utilization of a DC component, i.e., a linear range I of a plot of the output level against the Sagnac phase difference $\Delta\phi$ in FIG. 1.

However, this presents a narrow dynamic range problem since a measurable range of the Sagnac phase difference $\Delta\phi$ is narrower at a lower level due to the use of the linear portion of $\sin\Delta\phi$.

In order to improve this defect, a method is proposed in Electronics Letters 10th Nov. 1983 Vol. 19 No. 23 P 997 "Direct Rotation-Rate Detection with a Fiber-Optic Gyro By Using Digital Data Processing." That is, as the output signal of the lock-in amplifier detected by a phase modulation system, the fundamental and the high harmonic wave components ($2f_0$, $3f_0$, $4f_0$ ...) of a modulation frequency $f_0$ appear, as set out below, which include a Sagnac phase difference $\Delta\phi$ as a factor:

$$\text{Output Signal } P \sim P_0 \begin{bmatrix} J_1(\phi m) \cdot \sin\Delta\phi \cdot \sin 2\pi f_0 t & \text{first harmonic wave } S_1 \\ J_2(\phi m) \cdot \cos\Delta\phi \cdot \sin 4\pi f_0 t & \text{2nd harmonic wave } S_2 \\ J_3(\phi m) \cdot \sin\Delta\phi \cdot \sin 6\pi f_0 t & \text{3rd harmonic wave } S_3 \\ J_4(\phi m) \cdot \cos\Delta\phi \cdot \sin 8\pi f_0 t & \text{4th harmonic wave } S_4 \\ \vdots \end{bmatrix} \quad (1)$$

noting that $\Delta\phi$ is proportional to the detection rate and that Jn and $\phi$m represent an n-order Bessel function and phase modulation amplitude, respectively.

If, out of the output components, a ratio is taken for the 1st and 2nd harmonic waves $S_1$ and $S_2$ of the modulation frequency which are detected simultaneously, then a relation $$\frac{S_1}{S_2} = \frac{J_1(\phi m)\sin\Delta\phi}{J_2(\phi m)\cos\Delta\phi} \quad (2)$$

is established. Thus the Sagnac phase difference $\Delta\phi$ becomes $$\Delta\phi = \tan^{-1}\frac{J_2(\phi m)}{J_1(\phi m)} \cdot \frac{S_1}{S_2} \quad (3)$$

From this it will be appreciated that the Sagnac phase difference $\Delta\phi$ is detected from the 1st and 2nd components $S_1$ and $S_2$ of the modulation frequency contained in the output signal.

In order to accurately detect the Sagnac phase difference $\Delta\phi$ it is required that the factor $J_2(\phi m)/J_1(\phi m)$ in Equation (3) be made constant irrespective of the phase modulation amplitude $\phi m$. For the 4-th harmonic waves detected, therefore, the phase modulation amplitude should be so controlled as to make constant a ratio $$S_2/S_4 = J_2(\phi m)/J_4(\phi m) \quad (4)$$

This method employs the ratio $S_1/S_2$ of the two modulation frequency components and thus a light amount variation resulting from an interference noise is eliminated. It is, therefore, possible to obtain a broader dynamic range through the calculation of $\tan^{-1}$.

In this method, however, if as shown in FIG. 2 a better phase modulation amplitude $\phi m1$ or $\phi m2$ is selected for the 1st or 2nd Bessel function $J_1$ or $J_2$, then the variation of the factor $J_1(\phi)/J_2(\phi m)$ is increased with respect to the variation of the phase modulation amplitude $\phi m$. In order to achieve a better sensitivity level, it will be necessary to obtain as great an output amplitude as possible. As shown in FIG. 2, therefore, if the phase modulation amplitude $\phi m1$ or $\phi m2$ is set at a level at which the 1st or 2nd Bessel function $J_1$ or $J_2$ is maximized, then the differential coefficient $J_1'$ or $J_2'$ of the 1st or 2nd Bessel function $J_1$ or $J_2$ becomes greater. The variation of the phase modulation amplitude causes a greater variation in the 1st or 2nd Bessel function $J_2$ or $J_1$ and hence a greater variation in $J_1(\phi m)/J_2(\phi m)$.

For the phase modulation amplitude $\phi m1$ or $\phi m2$ the component of the 4-th Bessel function $J_4$ is at a smaller level and it is, therefore, difficult to make the phase modulation amplitude constant. As a result, $J_2(\phi m)/J_1(\phi m)$ is not stabilized, thus lowering the detection amplitude level.

SUMMARY OF THE INVENTION

It is accordingly the object of this invention to provide a fiber optical rotation sensor which can stably detect a rotation rate with high accuracy.

According to this invention, a fiber optical rotation sensor is provided which comprises:

a light source for producing a light wave;

an optical fiber forming a loop for sensing a rotation in accordance with the Sagnac effect;

means for coupling the light source to the optical fiber loop to provide a pair of light waves which propagate around the loop in opposite directions, and combining the pair of light waves to form an optical output signal;

means for generating a phase modulation signal having a frequency $f_0$ and modulating the phase of the light waves propagating in the fiber optical loop with the phase modulation signal;

means for detecting the optical output signal and converting the output signal to an electric signal;

means for extracting from the electric signal a frequency-component $S(n-1)$ of $(n-1)$ times the modulation frequency $f_0$, frequency-component $Sn$ of n-times the modulation frequency $f_0$ and frequency component $S(n+1)$ of $(n+1)$ times the modulation frequency $f_0$, where n represents an integer of 1 or more; and means for processing the extracted components $Sn-1$, $Sn$ and $Sn+1$ corresponding to $(n-1)$-, n- and $(n+1)$-times the modulation frequency $f_0$, respectively, to evaluate $$\tan^{-1}\left(K\frac{Sn}{Sn-1+Sn+1}\right)$$

proportional to a phase difference $\Delta\phi$ between the light waves.

BRIEF DESCRIPTION OF THE DRAWINGS

FIG. 1 is a graph showing a relation of a DC component extracted from a 1st harmonic wave detected by a conventional fiber optical gyroscope to a Sagnac phase difference;

DETAILED DESCRIPTION OF THE PREFERRED EMBODIMENT

Figure 3:
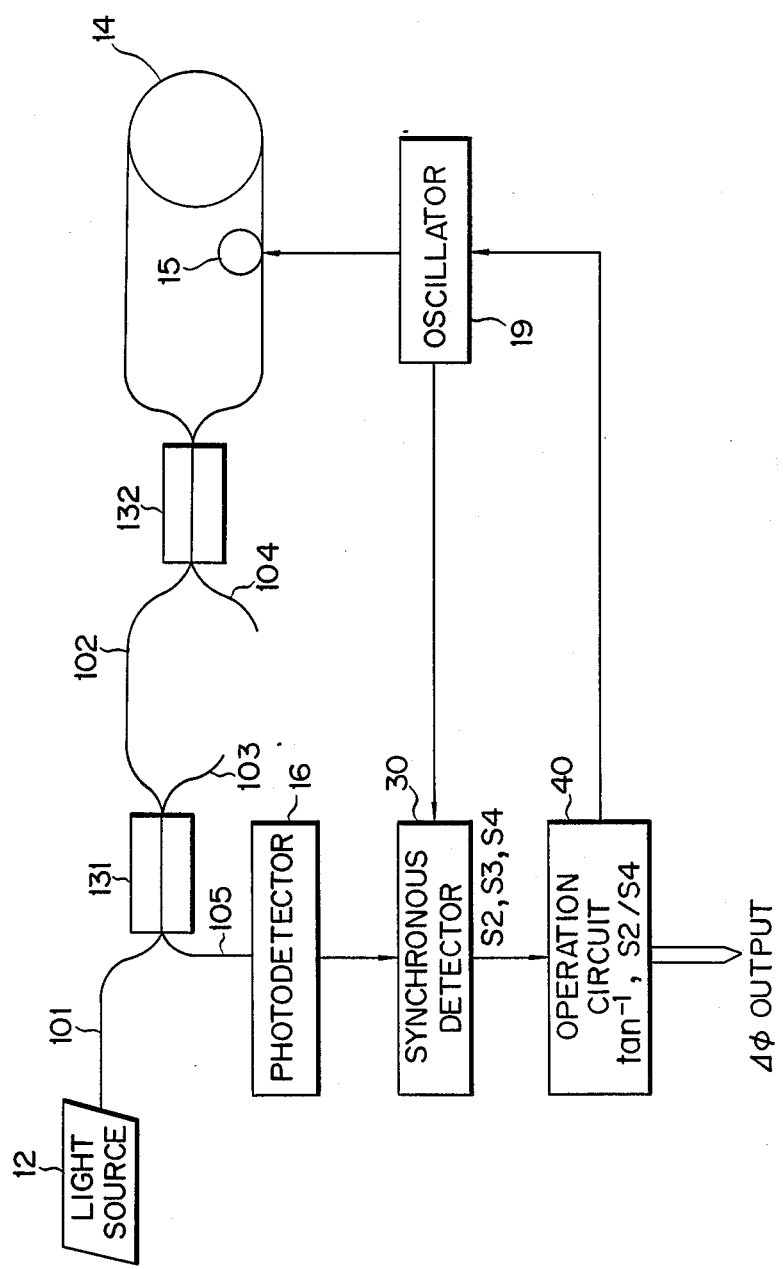
FIG. 3 is a block diagram showing a fiber optical gyroscope according to one embodiment of this invention.

FIG. 3 is a block diagram showing a fiber optical gyroscope according to one embodiment of this invention. In the fiber optical gyroscope shown in FIG. 3 a light source, such as laser unit 12, is optically coupled to optical fiber 101 so that a laser wave is emitted from laser unit 12 into optical fiber 101. One-directional optical coupler 131 is coupled to optical fiber 101 to permit the laser wave to be passed.

As well known in the art, one-directional optical coupler 131 is comprised of, for example, two optical fibers with their cores joined with an adequately thin cladding therebetween to allow the incoming laser wave to be split by an evanescent wave coupling into two waves, one of which is propagated into optical fiber 102 and the other of which is propagated into optical fiber 103 with a nonreflective end.

Optical fiber 102 is coupled through another one-directional optical coupler 132 to optical fiber loop 14. Optical coupler 132 allows the incoming laser wave to be split into the two laser waves, which are mutually oppositely propagated in optical fiber loop 14. Optical phase modulator 15 is inserted in optical fiber loop 14 and the two mutually counter-propagating laser waves upon a passage through phase modulator 15 are phase modulated with a modulation wave with a phase modulation amplitude $\phi m$ and modulation frequency $f_0$, as shown, for example, in FIG. 4, which has been oscillated by oscillator 19. Phase modulator 15, as seen from the aforementioned Publications, is comprised of a piezoelectric element on which an optical fiber is wound. When the piezoelectric element is oscillated by an oscillation signal of the phase modulation frequency $f_0$ coming from oscillator 19, the optical fiber on the piezoelectric element minutely expands and contracts, resulting in a variation in its optical path. The laser wave is phase modulated through the utilization of this phenomenon.

Figure 4:
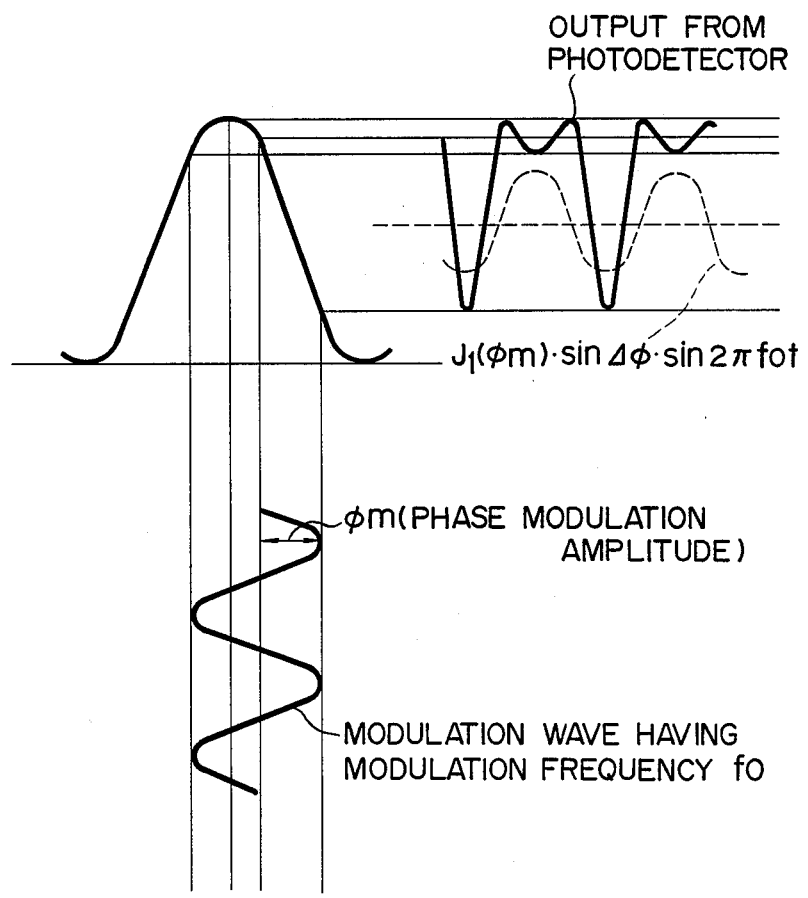
FIG. 4 is a graph showing a relation of a phase modulation wave supplied to a phase modulator of FIG. 3 to the waveform of a detection signal from a photodetector of FIG. 3.

One-directional optical coupler 132 allows an interference to occur between the mutually counter-propagating waves. The interference laser beam is split into two laser beams, one of which is propagated into optical fiber 104 with a nonreflective end and the other of which is transmitted through optical fiber 102 into one-directional optical coupler 131 where it is split into two waves for interference. One of the interference waves so split is guided through optical fiber 105 to photodetector 16 where it is detected. A detection signal from photodetector 16 as shown in FIG. 4 is supplied to synchronous detector 30 supplied with an oscillation signal from oscillator 19. Synchronous detector 30 detects the detection signal with the phase modulation frequency $f_0$ and its harmonic waves and delivers a predetermined output signal to operation circuit 40 where it is processed by an operation method as set forth below and the Sagnac phase difference $\Delta\phi$ is calculated. A feedback signal is supplied to oscillator 19 so as to maintain the phase modulation amplitude $\phi m$ constant.

In the aforementioned embodiment, the amplitude (i.e., an extent of modulation) of the modulation signal with the phase modulation frequency $f_0$ is so set as to substantially satisfy a Bessel function given below:

$$J_{n-1}(\phi m) = J_{n+1}(\phi m)$$

The laser wave subjected by the modulation signal to the phase modulation is split by one-directional coupler 132 into two waves, one of which is propagated into optical fiber 102 and the other of which is propagated into optical fiber 104. In this connection it is to be noted that light waves from one-directional optical coupler 132 are mutually counter-propagated in optical fiber loop 14 and are converted into two interference light waves.

One of the interference light waves from optical fiber 102 is coupled by optical coupler 131 to optical fiber 105, then detected by photodetector 16 and delivered as an output electric signal to synchronous detector 30.

Synchronous detector 30 synchronously detects the output of photodetector 16 with a frequency of an integral multiple of the phase-modulated output wave from oscillator 19 to extract the corresponding integral-multiple signal components $S_{n-1}$, $S_n$, $S_{n+1}$. The signal components $S_{n-1}$, $S_n$, $S_{n+1}$ ($n>1$) are supplied to operation circuit 40 where the aforementioned Sagnac phase difference $\Delta\phi$ given by $$\Delta\phi = \tan^{-1}\left( \frac{J_{n-1} + J_{n+1}}{J_n} \cdot \frac{S_n}{S_{n-1} + S_{n+1}} \right) \quad (5)$$

is gained.

$$\frac{J_{n-1} + J_{n+1}}{J_n}$$

At this time, the factor $$\frac{J_{n-1} + J_{n+1}}{J_n}$$

can be determined by controlling the amplitude $\phi m$ so that the components $(S_{n-1})$ and $S_{n+1}$ corresponding to $(n-1)$- and $(n+1)$-times the phase modulation wave are so set as to be maintained as $S_{n-1} = S_{n+1}$, or finding the phase modulation amplitude $\phi m$ from $S_{n-1}$ and $S+1$.

The advantage of the Sagnac phase difference $\Delta\phi$ lies in that a better detection accuracy is assured since, in the Bessel function $J_{n-1} = J_{n+1}$, the differential coefficient $J_n' = 0$ (the property of the Bessel function), since with respect to the phase modulation amplitude $\phi m$ a variation of the factor $$\frac{J_{n-1} + J_{n+1}}{J_n}$$

is small through the use of $J_{n-1} + J_{n+1}$ due to the establishment of $$|J'_n - 1| \text{ or } |J'_n + 1| > \frac{(J_{n-1} + J_{n+1})'}{J_n}$$

With $J'_{n-1}$, $J'_{n+1}$ and $J_{n-1} + J_{n+1}$ each representing a differential coefficient and since $J_{n-1}$, $J_n$, $J_{n+1}$ components are of relatively the same sensitivity level.

An explanation will be given below about utilizing 2nd, 3rd and 4th harmonic waves of the phase modulation frequency as one practical variant.

Figure 2:
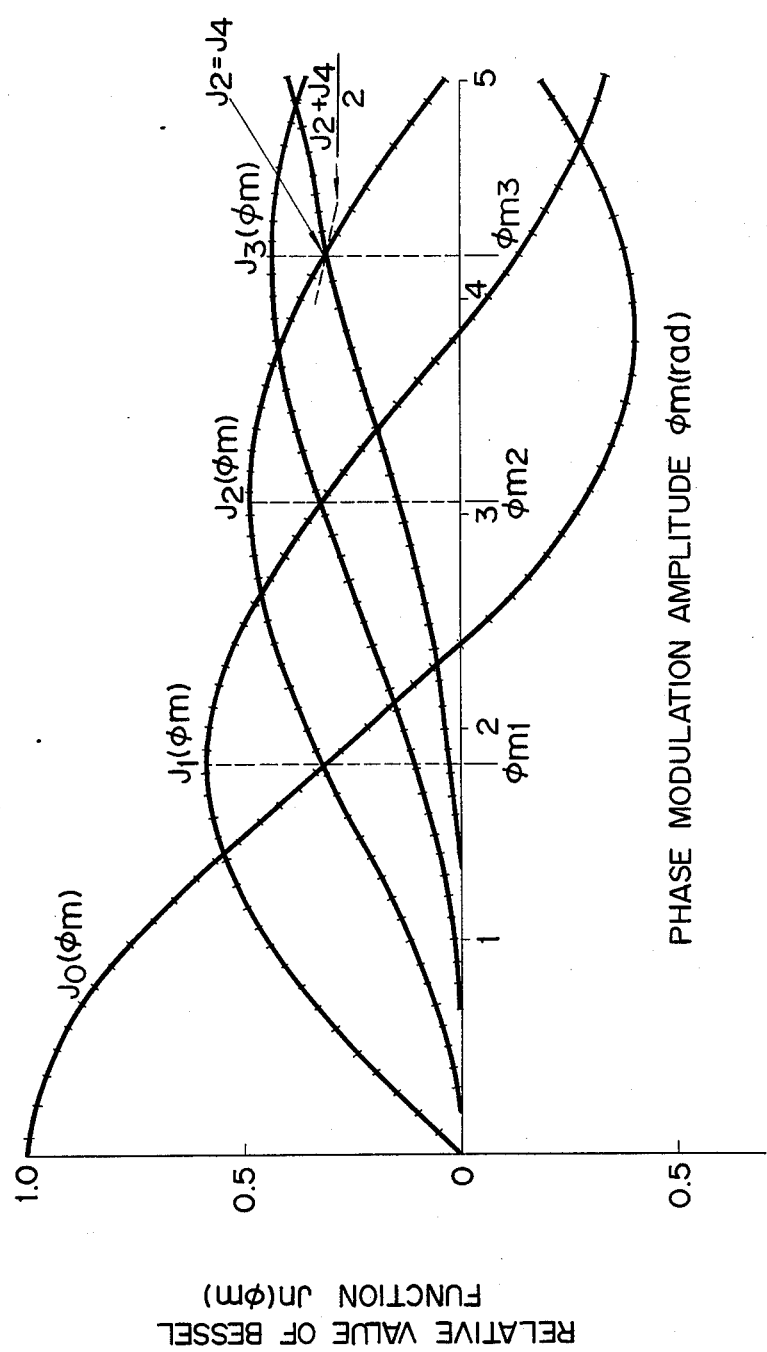
FIg. 2 is a graph showing a Bessel function.

In this case, the phase modulation amplitude $\phi m$ is so set that as shown in FIG. 2 $J_2(\phi m) = J_4(\phi m)$, that is, $J_3(\phi m)$ is maximal. This is achieved by detecting the 2nd frequency modulation component $S_2 = \cos\Delta\phi \cdot J_2(\phi m)$ and 4th frequency modulation component $S_4 = \cos\Delta\phi \cdot J_4(\phi m)$ by synchronous detector 30, detecting, for example, a difference between $S_2$ and $S_4$ by operation circuit 40 and controlling the output amplitude (phase modulation amplitude $\phi m$) of oscillator 19 so that the aforementioned difference becomes zero, that is, $S_2 = S_4$. Here, unless $\Delta\phi = 90°$ the modulation frequency components $S_2$ and $S_4$ can be detected due to the Sagnac phase difference. Furthermore, the Sagnac phase difference $\Delta\phi$ can be found by detecting the 3rd modulation frequency $S = \sin\Delta\phi \cdot J_3(\phi m)$ and evaluating Equation (5)

$$\Delta\phi = \tan^{-1}\left( \frac{J_2 + J_4}{J_3} \cdot \frac{S_3}{S_2 + S_4} \right)$$

by operation circuit 40. In this case, as will be seen from FIG. 2 the differential coefficient $J'_3 = 0$ ($J_3$ is maximal) for the phase modulation amplitude $\phi_{m3}$ and the differential coefficient $(J_2 + J_4)'$ is relatively flat, as shown in FIG. 2, with respect to the variation of the phase modulation amplitude $\phi_{m3}$, thus obtaining a stable fact $$\frac{J_2 + J_4}{J_3}.$$

Similarly, it is also possible to detect the aforementioned difference $\Delta\phi$ through the utilization of the modulation frequency components $S_1$, $S_2$ and $S_3$ and of the modulation frequency components $S_0$, $S_1$ and $S_2$. In this connection it is to be noted that in the former case it is necessary to detect the modulation frequency components $S_1$, $S_2$ at $\Delta\phi = 0$ (a very small rate) whereas in the latter case a circuit is required for detecting the modulation frequency components $S_0$.

In either case, the stable scale factor is obtained according to this invention in comparison with the conventional method for evaluating the Sagnac phase difference $\Delta\phi$ from $S_1/S_2$ through the use of the modulation frequency components $S_1$, $S_2$. It is, therefore, possible to provide a gyroscope which can stably detect a rotation rate with high accuracy.

As set out above, the optical fiber gyroscope of this invention assures a high-performance gyroscope with a stable scale factor.

What is claimed is:

1. A fiber optical rotation sensor, comprising:
   a light source for producing a light wave;
   an optical fiber forming a loop for sensing rotation in accordance with the Sagnac effect;
   means for coupling said light source to the optical fiber loop to provide a pair of light waves which propagate around the loop in opposite directions, and combining the pair of light waves to form an optical output signal;
   means for generating a phase modulating signal having a frequency $f_0$ and modulating the phase of the light waves propagating in the fiber optical loop with the phase modulation signal;

means for detecting the optical output signal and converting the output signal to an electric signal;

means for extracting from the electric signal a frequency component $S(n-1)$ of $(n-1)$ times the modulation frequency $f_0$, frequency component $Sn$ of n-times the modulation frequency $f_0$ and frequency $S(n+1)$ of $(n+1)$ times the modulation frequency $f_0$, where n represents an integer of 1 or more; and means for processing said extracted components $Sn-1$, $Sn$ and $Sn+1$ corresponding to said $(n-1)$-, n- and $(n+1)$-times the modulation frequency $f_0$, respectively, to evaluate $$\tan^{-1}\left(K\frac{Sn}{Sn-1+Sn+1}\right)$$

proportional to a phase difference $\Delta\phi$ between said light waves;

wherein said means for processing processes Bessel functions $Jn-1$ and $Jn+1$ contained in said frequency components $Sn-1$ and $Sn+1$ to produce a feedback signal and said modulation signal generating means is responsive to the feedback signal to generate a predetermined modulation amplitude and to substantially maintain the Bessel function $Jn-1$ equal to the Bessel function $Jn+1$ which are contained in said frequency components $Sn-1$ and $Sn+1$ processed by said processing means.

2. The rotation sensor according to claim 1, wherein n represents an integer of 2 or more.

3. The rotation sensor according to claim 1, wherein n represents an integer of 3.

4. The rotation sensor according to claim 3, wherein said coupling means includes a first one-directional optical coupler for splitting said light wave into a pair of light waves which propagate around said loop in mutually opposite directions.

5. The rotation sensor according to claim 4, wherein said coupling means includes a second one-directional optical coupler located between said light source and said first one-directional optical coupler to allow the light wave from said light source to be directed to said first one-directional optical coupler and a coupled light wave from said first one-directional optical coupler to be directed to said detecting means.

* * * * *